United States Patent
Dyers, Jr. et al.

(10) Patent No.: US 10,221,313 B2
(45) Date of Patent: Mar. 5, 2019

(54) CURABLE COMPOSITIONS CONTAINING BENZOXAZINE EPOXY BLEND AND USE THEREOF

(71) Applicant: Cytec Industries Inc., Woodland Park, NJ (US)

(72) Inventors: Leon Dyers, Jr., Shelby, NC (US); Mark Richard Bonneau, Brea, CA (US); James Martin Griffin, Orange, CA (US)

(73) Assignee: Cytec Industries Inc., Woodland Park, NJ (US)

( * ) Notice: Subject to any disclaimer, the term of this patent is extended or adjusted under 35 U.S.C. 154(b) by 62 days.

(21) Appl. No.: 15/176,226

(22) Filed: Jun. 8, 2016

(65) Prior Publication Data

US 2016/0362554 A1 Dec. 15, 2016

Related U.S. Application Data

(60) Provisional application No. 62/174,759, filed on Jun. 12, 2015.

(51) Int. Cl.
| | | |
|---|---|---|
| *C08L 79/02* | (2006.01) | |
| *C08J 5/04* | (2006.01) | |
| *C08L 63/00* | (2006.01) | |
| *C08J 5/24* | (2006.01) | |
| *C08G 59/24* | (2006.01) | |
| *C08K 5/357* | (2006.01) | |

(52) U.S. Cl.
CPC ............. *C08L 79/02* (2013.01); *C08G 59/24* (2013.01); *C08J 5/042* (2013.01); *C08J 5/24* (2013.01); *C08K 5/357* (2013.01); *C08L 63/00* (2013.01); *C08J 2363/00* (2013.01); *C08J 2379/02* (2013.01)

(58) Field of Classification Search
CPC ......... C08L 63/00; C08L 79/02; C08G 59/24; C08J 5/042; C08J 5/24; C08K 5/357
See application file for complete search history.

(56) References Cited

U.S. PATENT DOCUMENTS

2010/0330287 A1 12/2010 Tietze et al.
2016/0185907 A1* 6/2016 Gupta ................ C08G 73/0233
428/114

FOREIGN PATENT DOCUMENTS

| WO | 20080060545 A1 | 5/2008 |
| WO | 20130148408 A1 | 10/2013 |
| WO | 20160109406 A1 | 7/2016 |

OTHER PUBLICATIONS

Choi Seong-Woo et al: "Preparation of Dendritic Macromolecules Containing Benzoxazine Moiety"; Polymer Preprints, American Chemical Society, US; vol. 42, No. 2, Jan. 1, 2001 (Jan. 1, 2001); pp. 433-434, XP009188842, ISSN: 0032-3934.

* cited by examiner

*Primary Examiner* — Edward J Cain
(74) *Attorney, Agent, or Firm* — Thi Dang

(57) ABSTRACT

A curable resin composition capable of providing good OHC performance at elevated temperatures when used in polymer matrix composites. This resin composition includes, as major components, one or more multifunctional benzoxazine compounds and cycloaliphatic epoxy resin.

14 Claims, No Drawings

CURABLE COMPOSITIONS CONTAINING BENZOXAZINE EPOXY BLEND AND USE THEREOF

The present application claims the benefit of prior U.S. Provisional Application No. 62/174,759 filed on Jun. 12, 2015, which is incorporated herein by reference.

DETAILED DESCRIPTION

In recent years, polymer matrix composite (PMC) materials have been used in high-performance structures such as airplane parts and automobile parts as high-strength, low weight materials to replace metals. PMC materials contain reinforcement fibers, such as carbon, glass and aramid fibers, embedded in a polymeric matrix material. As the matrix resins used in PMC materials, thermosetting resins are mainly used because of their high solvent resistance and thermal resistance.

The polymers most widely used in PMC are thermosets, which belong to a class of resins that crosslink and form a three-dimensional network structure when cured. Once cured, the network structure is irreversible and cannot be reshaped or made to flow below its decomposition temperature.

Epoxy resins are often used as polymeric matrix material because of the adhesiveness between the epoxy resins and the reinforcing fibers, and the mechanical properties such as strength and stiffness of the composite material obtained. Many aerospace applications use amine-cured, multifunctional epoxies that require curing at elevated temperatures and pressures. Toughened epoxy containing thermoplastics and/or reactive rubber compounds to counteract brittleness due to high degree of crosslinking have become the norm in composite airframes.

Benzoxazines offers a number of advantages as compared to other thermoset resins such as epoxies. Those advantages include relatively long shelf-life, molecular design flexibility, low cost, high glass transition temperature ($T_g$), high modulus, relatively low viscosities, good flame retardant properties, low moisture absorption, no by-products released during curing and very low shrinkage upon curing. Furthermore, benzoxazines are capable of being self-cured upon heating; i.e. there is no need for an additional curing agent. However, currently available multifunctional benzoxazines are glassy solids at temperatures below 120° C. making them difficult to process using standard aerospace techniques such as prepregging and resin infusion.

The design of composite materials for use in aerospace structures typically takes into account the hot/wet performance of the material. Aircrafts must consider the extreme environmental factors such as high temperatures and high level of humidity since they can experience high temperatures for hours while the humidity levels are unknown.

One of the important properties of aerospace composite materials is the hot-wet compressive performance (i.e., hot-wet open hole compression or HW-OHC strength under hot/wet conditions), by which is meant the way in which the OHC strength decreases at elevated temperatures after a prolonged exposure to moisture.

It is standard practice to use bolts, rivets and other fasteners to assemble composite laminate for primary structures such as the fuselage of an airplane. The holes that have been drilled to accommodate these fasteners are considered artificial defects and can be the points of failure under compressive stress. OHC testing is the accepted method to predict this failure in composite materials.

The OHC strength of many existing PMC materials is typically constant at room temperature (e.g. 21° C.) or below but can deteriorate significantly at elevated temperatures when saturated with moisture. A high temperature together with moisture has been known to reduce the composite compressive strengths.

Commercially available resin systems such as Cycom® 977-3 (highly cross-linked epoxy) and Cycom® 5250-4 (bismaleimide) from Cytec Industries Inc. have been developed for high-performance aerospace applications. Composites based on these resin systems exhibit good hot-wet open hole compression (HW-OHC strength) under hot/wet conditions at elevated temperatures, thus they are particularly suitable for making primary structures of airplanes.

Even though there are numerous publications regarding benzoxazine compounds and synthesis thereof, little is known of their OHC performance under hot-wet conditions at use temperatures normally used for BMI's (i.e. 149° C.). Benzoxazine-based composites have been considered to have inherently good compressive and tensile strength as compared to that of highly cross-linked epoxy systems and bismaleimide systems. Thus, it would be desirable to have a benzoxazine-containing resin system that can be used for manufacturing high-performance composites with good HW-OHC strength at elevated temperatures, e.g. >105° C. To that end, it is desirable that HW-OHC strength at elevated temperatures is equivalent to or better than that associated with the epoxy and bismaleimide systems for aerospace applications.

Disclosed herein is a curable resin composition capable of providing good OHC performance at elevated temperatures, e.g. >105° C., when used in polymer matrix composites. This resin composition includes, as major components, one or more multifunctional benzoxazine compounds and cycloaliphatic epoxy resin.

Resin Systems

One aspect of the present disclosure is directed to a curable benzoxazine-epoxy hybrid resin composition capable of providing good OHC performance at elevated temperatures, e.g. >105° C., more specifically, 121-149° C. (or 250-350° F.), when used in polymer matrix composites. According to one embodiment, this resin composition includes, as major components:

(A) a cycloaliphatic epoxy resin containing two or more epoxide groups;
(B) a tri-functional benzoxazine compound; and
(C) optionally, a phenol compound as a catalyst.

As used herein, a "curable" composition refers to a composition prior to curing and a "cured matrix resin" refers to a cured resin produced from curing the curable composition.

The weight ratio of (A) epoxy resin component to (B) tri-functional benzoxazine component may be 5:95 to 90:10, and in some embodiments, 20:80 to 70:30. In one embodiment, the combination of components (A) and (B) constitutes for more than 50% by weight of the composition. In another embodiment, the combination of components (A) and (B) constitutes for more than 80% by weight of the composition.

The cycloaliphatic epoxy resin is used as the epoxy component because it provides a good balance of fracture toughness, glass transition temperature ($T_g$) and processabilitly as compared to other types of epoxy resins. Suitable cycloaliphatic epoxies are compounds that contain at least one cycloaliphatic ring and at least two oxirane rings per molecule. In a preferred embodiment, the cycloaliphatic epoxy is 3',4'-epoxycyclohexyl-3,4-epoxycyclohexane carboxylate, represented by the following structure:

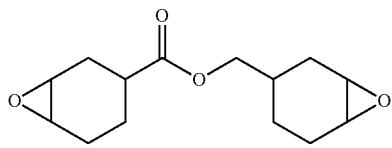 [SMILES: O=C(OCC1CCC2OC2C1)C1CCC2OC2C1]

This epoxy of structure is commercially available as Araldite® CY-179 from Huntsman Advanced Materials. Other examples of cycloaliphatic epoxies include: EPONEX epoxy resins, e.g. EPONEX Resin 1510, from Momentive Specialty Chemicals; Epotec® epoxy resins, e.g. YDH 184, YDH 3000, from Aditya Birla Chemicals; ERL™ 4221 (3,4-epoxycyclohexylmethyl-3',4'-epoxycyclohexane carboxylate) from Dow Chemical.

The tri-functional benzoxazine compound suitable for the purposes herein may be represented by the following generic structure I:

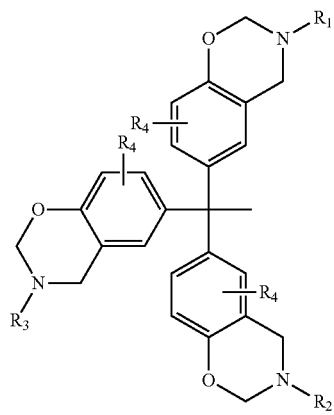

(I)

where $R_1$, $R_2$ and $R_3$ are independently selected from alkyl (preferably $C_{1-8}$ alkyl), cycloalkyl (preferably $C_{5-7}$ cycloalkyl, particularly $C_6$ cycloalkyl), and aryl, wherein the cycloalkyl and aryl groups are optionally substituted, for instance by $C_{1-8}$ alkyl, halogen and amine groups, and preferably by $C_{1-8}$ alkyl, and where substituted, one or more substituent groups (preferably one substituent group) may be present on each cycloalkyl and aryl group; $R_4$ is selected from hydrogen, halogen, alkyl and alkenyl.

Specific examples of suitable tri-functional benzoxazines include the following compounds:

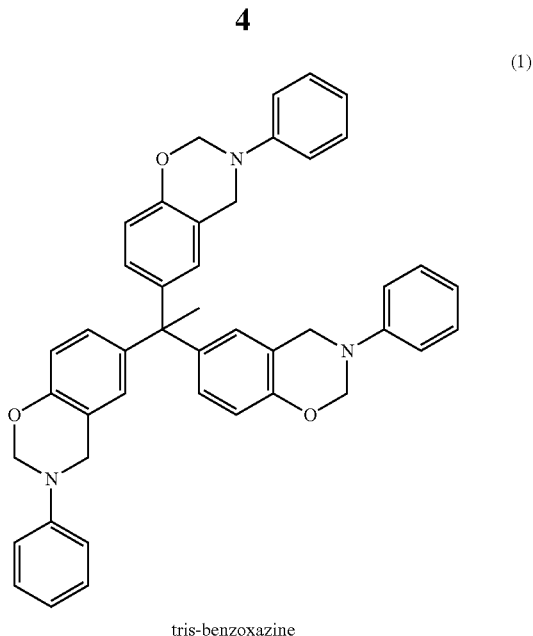

tris-benzoxazine

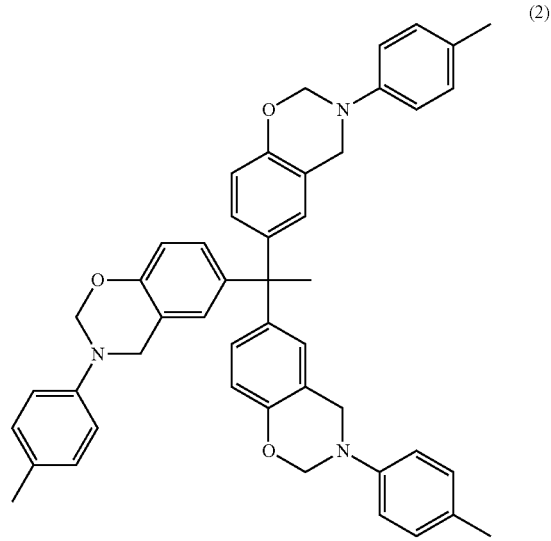

p-tris benzoxazine

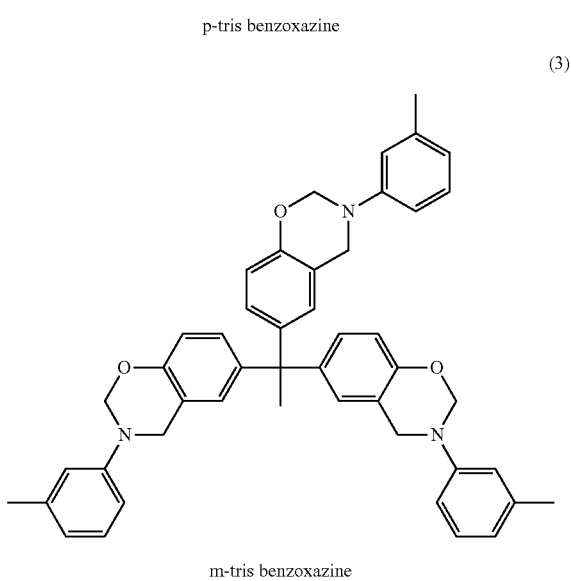

m-tris benzoxazine

The chemical name of compound (3) is 6,6',6"-ethane-1,1,1-triyltris(3-(3-methylphenyl)-3,4-dihydro-2H-1,3-benzoxazine (also referred herein as "m-tris benzoxazine").

The tri-functional benzoxazines disclosed herein may be synthesized by reacting tris-phenols with aromatic amines and formaldehyde using conventional solvent-based or solventless synthesis methods. More specifically, the aniline tris benzoxazine (C) may be synthesized by reacting 1,1,1-tris(4-hydroxyphenyl)ethane with aniline and para-formaldehyde (or p-formaldehyde). The p-tris benzoxazine (2) may be synthesized by reacting 1,1,1-tris(4-hydroxyphenyl)ethane with p-formaldehyde and p-toluidine, and the m-tris benzoxazine (3) may be synthesized by reacting 1,1,1-tris(4-hydroxyphenyl)ethane with p-formaldehyde and m-toluidine.

The phenol compound is highly effective as a catalyst (or cure accelerator) for the benzoxazine-epoxy resin system of the present disclosure. An example of a suitable phenol compound is thiodiphenol (TDP) represented by the following structure:

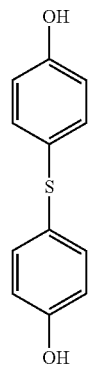 [SMILES: Oc1ccc(Sc2ccc(O)cc2)cc1]

Examples of other possible phenol compounds include 4,4'-Ethylidenebisphenol, 4,4'-[1-[4-[1-(4-hydroxyphenyl)-1-methylethyl]phenyl]ethylidene]bisphenol, 4-sec-buytl-2,6,-ditert-butylphenol, 4,4'-(9-fluoroenylidene)-diphenol, 4,4'-(1-3-phenylenediisopropylidene)bisphenol, 4,4' cyclohexylidenebisphenol, 4,4'-isopropylidenebis2,6-dimethylphenol. If present, the amount of phenol compound may be up to 15% by weight based on the total weight of the composition.

According to another embodiment of the present disclosure, the curable resin composition further includes (D) a di-functional benzoxazine compound.

In this embodiment, the benzoxazine component in the composition—compounds (B) and (D)—makes up more than 50% by weight based on the total weight of components (A)-(D) or total weight of the composition when there are other additives.

The di-functional benzoxazine compound is characterized by having two oxazine rings. Suitable di-functional benzoxazines may be represented by the following generic formula I:

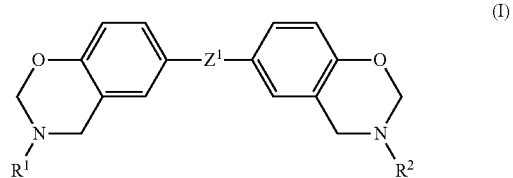

where
- $Z^1$ is selected from a direct bond, $-C(R^3)(R^4)-$, $-C(R^3)(aryl)-$, $-C(O)-$, $-S-$, $-O-$, $-S(O)-$, $-S(O)_2-$, a divalent heterocycle and $-[C(R^3)(R^4)]_x-$arylene-$[C(R^5)(R^6)]_y-$, or the two benzyl rings of the benzoxazine moieties may be fused; and
- $R^1$ and $R^2$ are independently selected from alkyl (preferably $C_{1-8}$ alkyl), cycloalkyl (preferably $C_{6-7}$ cycloalkyl, preferably $C_6$ cycloalkyl) and aryl, wherein the cycloalkyl and aryl groups are optionally substituted, for instance by $C_{1-8}$ alkyl, halogen and amine groups, and preferably by $C_{1-8}$ alkyl, and where substituted, one or more substituent groups (preferably one substituent group) may be present on each cycloalkyl and aryl group;
- in one embodiment, $Z^1$ is selected from a direct bond, $-C(R^3)(R^4)-$, $-C(R^3)(aryl)-$, $-C(O)-$, $-S-$, $-O-$, a divalent heterocycle and $-[C(R^3)(R^4)]_x-$arylene-$[C(R^5)(R^6)]_y-$, or the two benzyl rings of the benzoxazine moieties may be fused;
- $R^3$, $R^4$, $R^5$ and $R^6$ are independently selected from H, $C_{1-8}$ alkyl (preferably $C_{1-4}$ alkyl, and preferably methyl), and halogenated alkyl (wherein the halogen is typically chlorine or fluorine (preferably fluorine) and wherein the halogenated alkyl is preferably $CF_3$); and
- x and y are independently 0 or 1;
- where $Z^1$ is selected from a divalent heterocycle, it is preferably 3, 3-isobenzofuran-1(3h)-one, i.e. wherein the compound of formula (III) is derived from phenolphthalein;
- where $Z^1$ is selected from $-[C(R^3)(R^4)]_x-$arylene$-[C(R^5)(R^6)]_y-$, then the chain linking the two benzoxazine groups may further comprise one or more arylene group(s) and/or one or more $-C(R^7)(R^8)-$ group(s) where $R^7$ and $R^8$ are independently selected from the groups defined hereinabove for $R^3$.

In a preferred embodiment, the arylene group is phenylene. In one embodiment, the groups attached to the phenylene group may be configured in para- or meta-positions relative to each other. In a preferred embodiment, the aryl group is phenyl.

The group $Z_1$ may be linear or non-linear, and is typically linear. The group $Z_1$ is preferably bound to the benzyl group of each of the benzoxazine moieties at the para-position relative to the oxygen atom of the benzoxazine moieties, as shown in formula (I), and this is the preferred isomeric configuration. However, the group $Z_1$ may also be attached at either of the meta-positions or the ortho-position, in one or both of the benzyl group(s) in the bis-benzoxazine compound. Thus, the group $Z_1$ may be attached to the benzyl rings in a para/para; para/meta; para/ortho, meta/meta or ortho/meta configuration. In one embodiment, the difunctional benzoxazine resin component comprises a mixture of isomers, preferably wherein the major portion of the mixture is the para/para isomer shown in structure IV, and preferably this is present in at least 75 mol %, preferably at least 90 mol %, and preferably at least 99 mol %, of the total isomeric mixture.

In a preferred embodiment, the difunctional benzoxazine is selected from compounds wherein $Z^1$ is selected from —C(CH$_3$)$_2$—, —CH$_2$— and 3,3-isobenzofuran-1(3H)-one, i.e. benzoxazine derivatives of bisphenol A, bisphenol F and phenolphthalein.

In another embodiment, the difunctional benzoxazine is selected from compounds wherein $R^1$ and $R^2$ are independently selected from aryl, preferably phenyl. In one embodiment, the aryl group may be substituted, preferably wherein the substituent(s) are selected from $C_{1-8}$ alkyl, and preferably wherein there is a single substituent present on at least one aryl group. $C_{1-8}$ alkyl includes linear and branched alkyl chains. Preferably, $R^1$ and $R^2$ are independently selected from unsubstituted aryl, preferably unsubstituted phenyl.

Specific examples of suitable di-functional benzoxazines include:

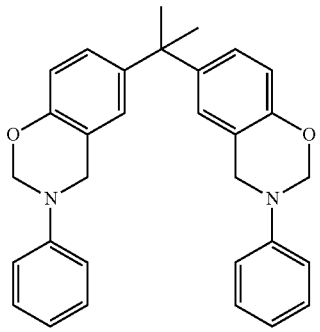

Bisphenol-A benzoxazine

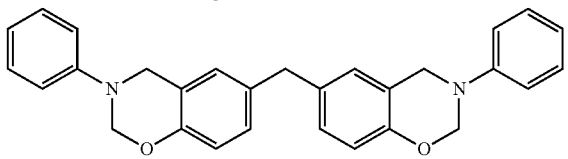

Bisphenol-F benzoxazine

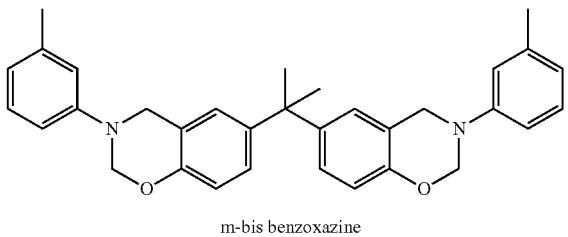

m-bis benzoxazine

The di-functional benzoxazines disclosed herein may be synthesized by reacting polyhydric phenols, specifically, bisphenols or, with aromatic amines and formaldehyde. Some di-functional benzoxazines such as Bisphenol-A and Bisphenol F benzoxazines are commercially available.

Optional Additives

Toughening agents (or tougheners) may be added to produce a toughened matrix resin suitable for high-strength composites, such as those used in aerospace application. Suitable toughening agents include, but are not limited to, thermoplastic toughening agents such as polyethersulphone (PES), co-polymer of PES and polyetherethersulphone (PEES), elastomers, including liquid rubbers having reactive groups, particulate toughening agents such as thermoplastic particles, glass beads, rubber particles, and core-shell rubber particles.

Functional additives may also be included in the curable composition to influence one or more of mechanical, rheological, electrical, optical, chemical, flame resistance and/or thermal properties of the cured or uncured resin composition. Examples of such functional additives include, but are not limited to, fillers, color pigments, rheology control agents, tackifiers, conductive additives, flame retardants, ultraviolet (UV) protectors, and the like. These additives may take the form of various geometries including, but are not limited to, particles, flakes, rods, and the like.

If present, the total amount of optional additives, including toughener(s) and functional additive(s) is up to 15% by weight based on the total weight of the composition.

Composites and Methods of Making

Another aspect of the present disclosure is directed to composite materials and methods for making the same. The curable composition as discussed above may be combined with reinforcement fibers to form a composite material. Reinforcing fibers may take the form of short fibers, continuous fibers, filaments, tows, bundles, sheets, plies, and combinations thereof. Continuous fibers may further adopt any of unidirectional, multi-directional, non-woven, woven, knitted, stitched, wound, and braided configurations, as well as swirl mat, felt mat, and chopped-fiber mat structures. The composition of the fibers may be varied to achieve the required properties for the final composite structure. Exemplary fiber materials may include, but are not limited to, glass, carbon, aramid, quartz, polyethylene, polyester, poly-p-phenylene-benzobisoxazole (PBO), boron, polyamide, graphite, silicon carbide, silicon nitride, and combinations thereof. For the fabrication of high-strength composite materials, such as those for aerospace and automotive applications, it is preferred that the reinforcing fibers have a tensile strength of greater than 3500 MPa.

Reinforcement fibers may be present in the composite material at a content of 60% to 75%, preferably at least 68%, by weight. For high-performance structures such as those for industrial and aerospace applications, it is preferred to use continuous fibre made of, for example, glass, aramid (e.g. Kevlar) or carbon, at 30% to 70%, more especially 50% to 70% by volume.

To form composite materials, the reinforcing fibers may be impregnated or infused with the curable composition using conventional processing techniques such as, but not limited to prepregging and resin infusion.

The term "impregnate" refers to the introduction of a curable matrix resin material to reinforcement fibers so as to partially or fully encapsulate the fibers with the resin. The matrix resin for making prepregs may take the form of resin films or liquids. Moreover, the matrix resin is in a curable or uncured state prior to impregnation. Impregnation may be facilitated by the application heat and/or pressure.

As an example, the impregnating method for making prepregs may include:
(1) Continuously moving fibers through a (heated) bath of molten impregnating matrix resin composition to fully or substantially fully wet out the fibers; or
(2) Pressing top and bottom resin films against a sheet of continuous unidirectional fibers running in parallel or a fabric web while applying heat at a temperature that cause the resin film to be in a molten state.

After impregnation, the prepregs are in a curable/partially cured state and are still pliable. Prepregs are laid up onto each other in a particular orientation on a tool to form a laminate. The prepreg lay-up is then subjected to curing to form a composite part. Pressure may be applied during curing, dependent on the structural part and configuration, but the use of an autoclave is most common for high-performance structural parts.

Curing may be carried out at elevated temperature >175° C., preferably in the range of 180-200° C. For example a desirable cure profile may be ramp from 25° C. to 180° C. at 2° C/min. and hold at 180° C. for 2 hours then continue to ramp up to 200° C. and hold for 2 additional hours then cool down to RT. Preferably, curing is carried out with the application of elevated pressure to restrain deforming effects of escaping gases, or to restrain void formation, e.g. at pressure of 6.8-8.2 bars.

Alternatively, composite parts may be formed using a resin infusion process, which covers processing techniques such as Resin Transfer Molding (RTM) and Vacuum Assisted Resin Transfer Molding (VARTM). To fabricate a composite part through resin infusion, e.g. RTM or VaRTM processes, the first step is to form a dry fiber preform in the shape of the desired structural part. The preform generally includes a number of fabric layers or plies made from dry reinforcement fibers that impart the desired reinforcing properties to a resulting composite part. After the fiber preform has been formed, the preform is placed in a mold. The curable resin composition is injected directly into fiber preform, and then the resin-infused preform is cured. When the curable resin composition of the present disclosure is used in resin infusion methods, it is preferred that a catalyst, e.g. the phenol compound disclosed herein, is included.

EXAMPLES

Example 1

Eight different resin blends were prepared according to the formulations shown in Table 1. All values are in weight percentage unless stated otherwise.

"Tris BOX" refers to the aniline tris benzoxazine compound (1) described above and was synthesized according the following reaction:

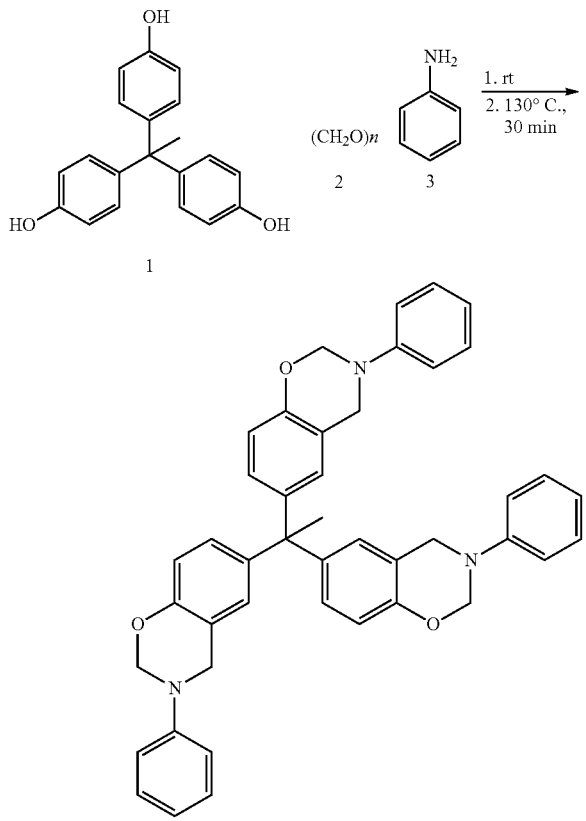

Tris-BOX

TABLE 1

| Reagents | RD2011-029 Bis-BOX | m-Bis-BOX | Araldite ® CY-179 | Pa-Type BOX | Tris BOX | m-Tris-BOX | p-Tris-BOX | TDP |
|---|---|---|---|---|---|---|---|---|
| Formulation 1 | 68 | | 23 | | | | | 9 |
| Formulation 4 | 70 | | | 30 | | | | |
| Formulation 5 | 48.11 | | 23.25 | | 19.55 | | | 9.1 |
| Formulation 6 | 47.52 | | 22.96 | | | 20.54 | | 8.98 |
| Formulation 9 | 35 | | | 30 | 35 | | | |
| Formulation 10 | 48 | | 23 | | | | 20 | 9 |
| Formulation 11 | 0 | | 23 | | 68 | | | 9 |
| Formulation 12 | 48.11 | 58 | 23 | | | | 10 | 9 |

RD2011-29 (Bisphenol A benzoxazine) and Araldite CY179 (cycloaliphatic epoxy) were supplied by Huntsman Advanced Materials. TDP refers to thiodiphenol.

"Pa-Type BOX" was a monofunctional benzoxazine supplied by Shikoku Chemical Corporation and is represented by the following structure:

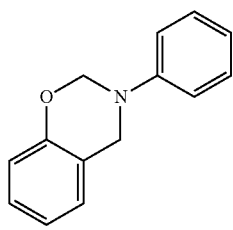 [SMILES: c1ccc(N2COc3ccccc3C2)cc1]

150 g (0.49 mol) of 1,1,1-tris(4-hydroxyphenyl)ethane and 93 g (3.1 mol) para-formaldehyde were thoroughly mixed in a 2 L glass reactor equipped with a mechanical stirrer at room temperature. Then 143.6 g (1.54 mol) of aniline was added at room temperature to avoid foaming. The reaction mixture was stirred with the slow addition of aniline at room temperature. After the internal reaction temperature cools to 60° C., the reactor was then submerged in an oil-bath preheated at 80° C. The resulting reaction mixture was a viscous semi-solid. The oil bath was heated to 110° C. for 30 minutes. The oil bath was then heated to 130° C., when the internal temperature was above 110° C. the reaction timer was set for 30 minutes. After 30 minutes, the molten reaction mixture was poured into an aluminum dish using a spatula to distribute the resin evenly over the pan and allowed to cool to room temperature. The resulting gold crystalline product was then ground into a powder. The powder was washed twice in 2 L of a 1 N NaOH solution at 70° C. and in 2 L of water at the same temperature as many times as needed to obtain a neutral pH. The product was dried in a vacuum oven for a week at 45° C.

"m-Tris-BOX" refers to the m-tris benzoxazine compound (3) discussed above and was synthesized according to the method disclosed in U.S. patent application Ser. No. 14/980,407, filed on Dec. 28, 2015 and assigned to Cytec Industries Inc.

"p-Tris-BOX" refers to the p-tris benzoxazine compound (2) discussed above and was synthesized according to the method disclosed in U.S. patent application Ser. No. 14/562,799, filed on Dec. 8, 2014 and assigned to Cytec Industries Inc.

Resin films were formed from the resin formulations disclosed on Table 1. Each resin film had a film weight of about 39 gsm. Prepregs were made by impregnating unidirectional IM7 carbon fibers in web form with the resin films using a hot-melt lamination method. The target fabric areal weight (FAW) for the carbon fibers was 145 gsm and 35% resin content per prepreg. With the use of hot-melt prepregging equipment, two resin films were applied to a unidirectional carbon fiber web on both the top and bottom simultaneously, and impregnation was done with the aid of a hot plate heated to temperature between 160° F. and 230° F. Composite laminate was made by laying up 24 prepreg plies according to orientation [+45/90/−45/0]3s to create a composite panel. During composite panel fabrication, debulking was also carried out every $4^{th}$ ply, for 3 minutes under vacuum. Subsequently, the composite panel was vacuum bagged and cured in an autoclave at 8.16 bars for 2 h at 180° C. and then an additional 2 h at 200° C.

The cured composite panels were tested to determine open hole compression (OHC) and open hole tension (OHT) performance using ASTM test methods D6484 and D766 respectively.

To obtain data for OHC, 12×1.5 inch test specimens of cured composite panels were made. A 0.25 inch hole was drilled in the center of each test specimen. Specimens were conditioned by immersing specimens in a water bath set at 71° C. for 2 weeks.

The OHC results are shown in Table 2.

TABLE 2

| Open Hole Compression (OHC) Test Values (MPa) | | | | |
|---|---|---|---|---|
| | Dry (23° C.) | Wet* (82° C.) | Wet* (121° C.) | Wet* (149° C.) |
| Formulation 1 | 349.6 | 322 | 301.3 | 240.6 |
| Formulation 4 | 357.2 | 342.7 | 251.7 | 128.9 |
| Formulation 5 | 368.2 | 328.9 | 306.1 | 269.6 |
| Formulation 6 | 340.6 | 321.3 | 310.3 | 264.1 |
| Formulation 9 | 348.2 | 318.5 | 290.3 | 190.3 |
| Formulation 10 | 363.4 | 340 | 325 | 289.7 |
| Formulation 11 | 355.8 | 340 | 313 | 289.6 |
| Formulation 12 | 367 | 329 | 311.7 | 293 |

*conditioned: 2-week water soak

The resin formulations that contained both the Araldite CY-179 cycloaliphatic epoxy and tri-functional benzoxazines (Formulations 5, 6, 10-12) yielded the best wet OHC performance at higher temperatures, 121° C. and 149° C. These high values in wet OHC at 121° C. and 149° C. were also accompanied by an increase in dry and wet $T_g$ as compared to other resin formulations, see Table 3.

TABLE 3

| Composite $T_g$ (° C.) as determined by DMTA | | | | | | | | |
|---|---|---|---|---|---|---|---|---|
| | Resin Formulation | | | | | | | |
| | 1 | 4 | 5 | 6 | 9 | 10 | 11 | 12 |
| Dry Tg (E') onset | 208.5 | 168.7 | 228.7 | 231.1 | 181.4 | 229 | 235 | 251 |
| Wet Tg (E') onset | 169.9 | 148.6 | 181.1 | 180.8 | 150.1 | 182 | 183 | 189 |

$T_g$ was measured by Dynamic Mechanical Thermal Analysis (DMTA). It was observed that the tri-functional benzoxazines lowered the $T_g$ of the benzoxazine composites that contained no cycloaliphatic epoxy (Formulation 9). Again, the increase in $T_g$ was achieved with having both the cycloaliphatic epoxy and tri-functional benzoxazines in the resin system.

The open hole tension (OHT) values for composite panels based on Formulations 1, 4, 5, 6, and 9 were measured and are reported in Table 4.

TABLE 4

| Open Hole Tension (OHT) Test Values (MPa) | | |
|---|---|---|
| | Condition | |
| Resin | 23° C. | −59° C. |
| Formulation 1 | 483.3 | 473.7 |
| Formulation 4 | 628.1 | 628.1 |
| Formulation 5 | 549.5 | 530.2 |
| Formulation 6 | 582.6 | 557.1 |
| Formulation 9 | 612.3 | 625.4 |

Composite panels based on Formulations 4, 5, 6, 9 had tension values greater than the composite panel based on Formulation 1. More importantly, the combination of tri-functional benzoxazine and epoxy (Formulations 5 and 6) did not cause a decrease in the OHT strength, instead an increase was obtained. This is unexpected because an increase in compressive strength is typically accompanied by a loss in tensile strength. This was not the case with the use of Formulations 5 and 6.

What is claimed is:

1. A curable resin composition comprising:
   (A) a cycloaliphatic epoxy resin containing two or more epoxide groups; and
   (B) a tri-functional benzoxazine compound represented by the following structure:

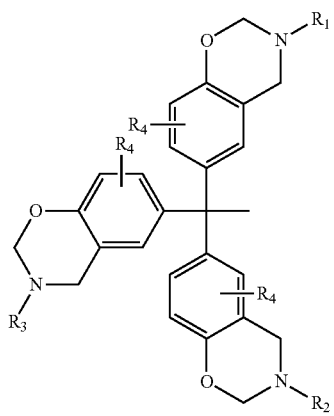

where $R_1$, $R_2$ and $R_3$ are independently selected from alkyl, cycloalkyl, and aryl, wherein the cycloalkyl and aryl groups are optionally substituted, and where substituted, one or more substituent groups may be present on each cycloalkyl and aryl group; and $R_4$ is selected from hydrogen, halogen, alkyl and alkenyl.

2. The curable resin composition of claim 1 further comprising:

(C) a phenol compound as a catalyst.

3. The curable resin composition of claim 1 further comprising:

(D) a di-functional benzoxazine compound.

4. The curable resin composition of claim 3, wherein the benzoxazine compounds (B) and (D) constitute for more than 50% by weight based on the total weight of the composition.

5. The curable resin composition of claim 1, wherein the tri-functional benzoxazine compound (B) is:

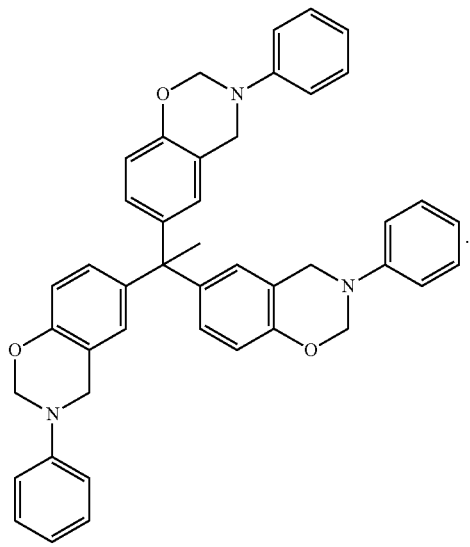

tris benzoxazine

6. The curable resin composition of claim 1, wherein the tri-functional benzoxazine compound (B) is:

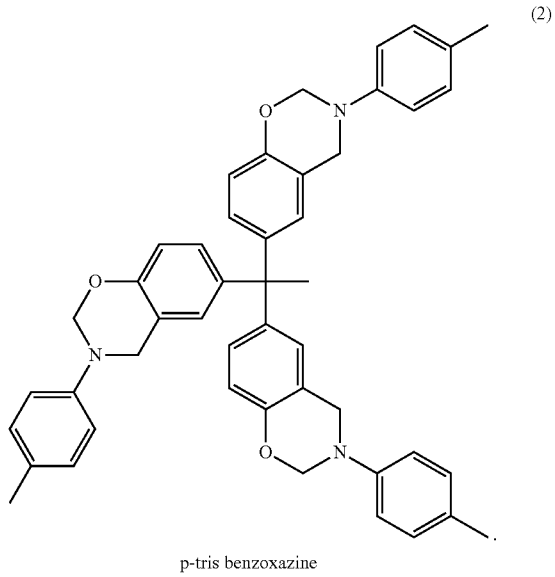 [SMILES: Cc1ccc(N2COc3ccc(C(C)(c4ccc5c(c4)CN(c4ccc(C)cc4)CO5)c4ccc5c(c4)CN(c4ccc(C)cc4)CO5)cc3C2)cc1]

p-tris benzoxazine

7. The curable resin composition of claim 1, wherein the tri-functional benzoxazine compound (B) is:

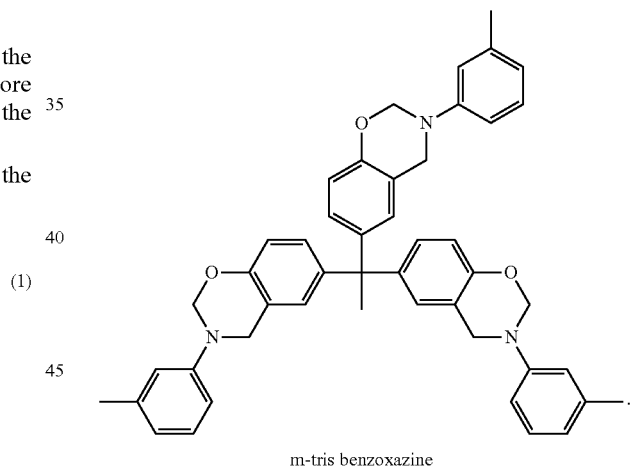

m-tris benzoxazine

8. The curable resin composition of claim 1, wherein the cycloaliphatic epoxy resin is 3',4'-epoxycyclohexyl-3,4-epoxycyclohexane carboxylate, represented by the following structure:

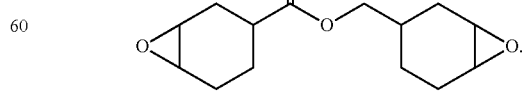

9. The curable resin composition of claim 3, wherein the di-functional benzoxazine compound (D) is represented by the following structure:

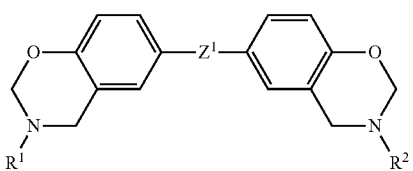

where:
Z$^1$ is selected from a direct bond, —C(R$^3$)(R$^4$)—, —C(R$^3$)(aryl)—, —C(O)—, —S—, —O—, —S(O)—, —S(O)$_2$—, a divalent heterocycle and —[C(R$^3$)(R$^4$)]$_x$ arylene-[C(R$^5$)(R$^6$)]$_y$—, or the two benzyl rings of the benzoxazine moieties may be fused; and R$^1$ and R$^2$ are independently selected from alkyl, cycloalkyl, and aryl, wherein the cycloalkyl and aryl groups are optionally substituted by a substituent selected from: C$_{1-8}$ alkyl, halogen and amine groups, and where substituted, one or more substituent groups may be present on each cycloalkyl and aryl group;

R$^3$, R$^4$, R$^5$ and R$^6$ are independently selected from H, C$_{1-8}$ alkyl, and halogenated alkyl; and x and y are independently 0 or 1.

10. The curable resin composition of claim 2, wherein the phenol compound (C) is thiodiphenol (TDP).

11. A composite material comprising reinforcement fibers impregnated or infused with the curable composition of claim 1.

12. The composite material of claim 11, wherein the reinforcement fibers are selected from carbon fibers, glass fibers, and aramid fibers.

13. A prepreg comprising reinforcement fibers impregnated or infused with the curable composition of claim 1, wherein reinforcement fibers are in the form of unidirectional fibers or a fabric.

14. A cured composite part produced from a method comprising: (i) impregnating or infusing reinforcement fibers with the curable composition of claim 1; and (ii) curing the resin-impregnated or resin-infused fibers.

* * * * *